Patented Aug. 15, 1950

2,519,100

UNITED STATES PATENT OFFICE 2,519,100

ATMOSPHERIC CURING OF ISOBUTYLENE-DIOLEFIN COPOLYMERS

Francis P. Baldwin, Linden, N. J., assignor to Standard Oil Development Company, a corporation of Delaware No Drawing. Application March 27, 1946, Serial No. 657,619

4 Claims. (Cl. 260—85.3)

This invention relates to an improvement in the method of curing synthetic rubber materials of the type of an isobutylene-diolefin copolymer and similar products, by means of an ester of a quinone dioxime.

It has been found that the use of esters of quinone dioxime for the curing of this copolymer of isobutylene and a diolefin and the like is particularly advantageous in the fact that the curing can be accomplished quickly and at medium temperatures, of the order of 240–280° F., without danger of scorching during the process. This reduction in the tendency toward scorchiness is realized particularly in the use of aromatic esters of quinone dioxime; but the use of aliphatic esters is also valuable in the fact that they show a good increase in solubility in solvents for the hydrocarbon polymer, as compared, for example, with paraquinone dioxime itself. Thus, the aliphatic esters are particularly useful for the preparation of dipped goods where the question of scorchiness does not enter, but where the question of solubility is paramount; and the aromatic esters show both a good increase in solubility and a very good reduction in tendency toward scorchiness, thereby greatly facilitating both the dispersion of the curing agent in the rubber compound and greatly reducing the difficulties of milling and compounding as well as yielding a very smooth homogeneous mixture which cures particularly well.

There is, however, a limit to the use of the quinone dioxime esters as curing agents because of the fact that curing cannot be accomplished at atmospheric pressure or without the presence of a confining mold. In the case of the curing of rubber-coated fabrics and dipped goods, the rubber is not confined in a mold and a method of curing such goods under normal atmospheric conditions is highly desirable. In accordance with the present invention it has been found that the quinone dioxime esters may be employed as curing agents under atmospheric curing conditions if there is added to the compounded rubber mixture containing the esters a minor proportion of an oxide of lead of the type of PbO or one of its hydrates (sometimes called hydroxides of lead) such as $PbO \cdot H_2O$, $(PbO)_2 \cdot H_2O$, $(PbO)_3 \cdot H_2O$, and the like. When such substances are added to the rubber mix, very satisfactory cures may be accomplished by curing the rubber material in an oven in the presence of air.

The primary raw material for the production of a synthetic rubber-like product of the present invention is the product of the interpolymerization of a polymerizable olefin of not more than 8 carbon atoms and a diolefin of 4 to 14 carbon atoms per molecule. More particularly, the invention applies to the low temperature interpolymer of isobutylene and a diolefin.

The low temperature interpolymer is customarily prepared by a low temperature catalysis. The raw material for this polymer preferably consists of a major proportion of isobutylene with a minor proportion of a polyolefin such as butadiene, isoprene, piperylene, dimethyl, butadiene, dimethallyl, myrcene, or the like, substantially any of the polyolefins having from 4 to 12 or 14 carbon atoms per molecule being usable. The preferred proportions range from 70 parts of isobutylene with 30 parts of the diolefin to 99.5 parts of isobutylene with 0.5 part of the polyolefin. The mixture is cooled to a temperature within the range between approximately −20 and −100° C., the preferred range being between −50 and −100° C. The cooling may be obtained by a refrigerating jacket on the storage container or polymerization reactor, or by the admixture into the olefinic material of a carbonaceous refrigerant. For internal refrigerant of this type, such substances as liquid ethylene, liquid propane, solid or liquid carbon dioxide, and the like are particularly useful. Other substances such as liquid methane under pressure, if desired, or liquid butane under vacuum, if desired, are also usable.

The cold mixture is polymerized by the application thereto of a Friedel-Crafts catalyst of a type depending upon the particular olefin to be polymerized. The preferred catalyst is a solution of a Friedel-Crafts catalyst such as aluminum chloride in solution in a low-freezing, non-complex-forming solvent such as ethyl or methyl chloride or carbon disulfide, or the like.

The Friedel-Crafts catalyst may be substantially any of the substances disclosed by N. O. Calloway in his article on the "Friedel-Crafts Synthesis" printed in the issue of "Chemical Reviews" published for the American Chemical Society at Baltimore in 1935, in volume XVII, No. 3, the article beginning on page 327, the list being particularly well shown on page 375. The catalyst may be a simple salt or may be one or another of a wide range of double salts depending upon the solvent it is desired to use, and the rate of speed at which the polymerization is to occur.

The catalyst solvent depends to a considerable extent upon the choice of metal halide to be used. If the metal halide is to be aluminum chloride, the preferred solvent is ethyl or methyl, mono- or polyhalide, usually the chloride, or carbon disulfide, or the like, the only limitation being that the material have a freezing point below 0° C. in order to allow the catalyst salt and catalyst solvent to dissolve in the mixed polymerizate. If the catalyst salt is to be aluminum bromide or a mixed salt, a hydrocarbon solvent is useful, including such substances as pentane, butane, propane, or ethane; liquid methane being usable, but less suitable because of its low boiling point, and hexane, heptane and octane being usable but less suitable because of their higher boiling points and the difficulty of removing them from the finished polymer. With a limited number of the higher polyolefins, gaseous boron trifluoride also may be used, particularly with dimethyl butadiene as the polyolefin. Preferably, however, the boron trifluoride is used in solution, either in liquid ethane or liquid propane or liquid butane.

The polymerization step is conveniently carried out either in successive batches or in a continuous process. In either event, the catalyst is desirably added to the polymerizate under conditions of high turbulence such as by application of the catalyst in the form of a fine spray onto the surface of the rapidly stirred olefinic mixture, or by delivery in the form of a fine jet under high pressure into a turbulence zone in the neighborhood of a high speed stirrer or in other analogous ways which will be obvious to those skilled in the art.

The polymerization proceeds rapidly to yield a high-grade solid polymer which is separated from residual quantities of unpolymerized olefins and diluent-refrigerant (if used) and brought up to room temperature. The warmed polymer is desirably milled on the open roll mill under a stream of water to remove as much as possible of the traces of catalyst and to drive out as much as possible of the unpolymerized olefinic material.

This procedure as above described is shown in greater detail in the Sparks and Thomas U. S. Patent 2,356,128, issued August 22, 1944, to which Australian Patent No. 112,875 corresponds.

In all of these polymers, an essential component is a polyolefin having from 4 to 12 or 14 carbon atoms per molecule, which may be conjugated or non-conjugated, and may have two or more double linkages.

In practicing the invention, the rubber polymer, prepared as above outlined, is compounded with a quinone dioxime ester, for example, p-quinone dioxime dibenzoate, and such other compounding agents as are advantageous including such substances as zinc oxide, stearic acid, carbon black, clay, and a wide range of other pigments and addition agents. For the production of a spreading dough or cement the compounded rubber polymer is mixed with a solvent, such as a paraffinic naphtha or the like. The processing and applications of the compounded polymer or a spreading dough containing the same may then be conducted in the usual manner.

Instead of or in addition to the dibenzoate ester, other esters of quinone dioxime may be used, such as the chlorobenzoate esters, bromobenzoate esters, alkylated benzoate esters, hydroxy benzoate esters, the furoic acid mono- or di-esters, the thiosalicylic acid esters, the cinnamic acid esters, or the alkyl esters, such as the dilaurate esters, the caprylic esters, the acetic esters and the like. Similarly, the corresponding esters of thymoquinone dioxime, naphthoquinone dioxime and anthraquinone dioxime can be employed.

The quinonoid ester is preferably present in the proportion of from 0.2 part to 10 parts per 100 parts of polymer, and the lead oxide or hydrated oxide may be added in the range from 1 to 20 parts per 100 parts of polymer. The compound may in addition be mixed with carbon black in the range from 0 to 200 parts per 100 parts polymer, with zinc oxide in the range from 1 part to 50 parts per 100 parts of polymer, and with stearic acid in the range from 1 part to 10 parts of polymer.

These compounding agents and ranges as indicated are preferred, but other compounding agents and wider ranges of proportions outside of the indicated limits are particularly useful for various special applications. The resulting compound is then formed into the desired shape which may include any of the usual methods for the processing of rubber or rubber substances including extruding into tubes or threads on a round wire, or calendering, or applying to fabric by a spreading procedure from a solution containing the rubbery substance and the dioxime ester and lead oxide, or by other procedures. The compounded synthetic rubber may then be cured at temperatures ranging from about 150° to 400° F., but preferably in the range from 240° to 280° F. at a time interval ranging from 5 to 60 minutes.

The curing operation yields a cured rubber-like article having a good tensile strength, a good elongation, a good abrasion resistance and other valuable properties.

In the examples which follow are given data on the properties of synthetic rubber products obtained by the use of curing ingredients in accordance with the present invention, but it is to be understood that these examples are given for purposes of illustration only and do not limit the scope of the invention in any way.

EXAMPLE 1

A polymer was prepared by polymerizing a mixture consisting of 97.5 parts of isobutylene of 99% purity with 2.5 parts of isoprene of 96% purity, at a temperature of approximately −120° C. by the application thereto of aluminum chloride in solution in metal chloride. The resulting polymer was separated from the cold reaction liquid, brought up to room temperature, washed with water in a slurry tank, and dried to remove substantially all of the low boiling hydrocarbons and substantially all traces of residual catalyst.

The resulting polymer was then compounded according to various recipes, all including p-quinone dioxime dibenzoate as the curing agent, as indicated in Tables I(a) and I(b), to show the effects of various metallic oxides and hydroxides on the curing of the polymer by means of this ester. For comparison, a recipe was prepared without any of such oxides or hydroxides.

One portion of each compounded polymer was cured under pressure by curing in a mold for 60, 120 and 180 minutes, respectively, at 250° F.; while another portion of the same was cured in an oven in the presence of air at atmospheric pressure, likewise for 60 minutes, 120 minutes and 180 minutes, respectively, at 250° F. The cured samples were submitted to tests of tensile strength, modulus at 300% elongation, and percent ultimate elongation, and these values are shown in Tables I(a) and I(b) under each recipe in the order given. In these tables the amounts of the various ingredients are shown as "parts per 100 parts of polymer."

*Table I(a)*

| | | | | | | |
|---|---|---|---|---|---|---|
| Co-polymer | 100.0 | 100.0 | 100.0 | 100.0 | 100.0 | 100.0 |
| Stearic Acid | 3.0 | 3.0 | 3.0 | 3.0 | 3.0 | 3.0 |
| Carbon Black | 54.0 | 54.0 | 54.0 | 54.0 | 54.0 | 54.0 |
| Paraquinone Dioxime Dibenzoate | 6.0 | 6.0 | 6.0 | 6.0 | 6.0 | 6.0 |
| ZnO | ----- | 5.0 | ----- | ----- | ----- | ----- |
| CaO | ----- | ----- | 5.0 | ----- | ----- | ----- |
| PbO | ----- | ----- | ----- | 5.0 | ----- | ----- |
| $Pb_3O_4$ | ----- | ----- | ----- | ----- | 5.0 | ----- |
| $PbO_2$ | ----- | ----- | ----- | ----- | ----- | 5.0 |
| Tensile—Mod. at 300%—Elong.: | | | | | | |
| Press. Cured 60 min./250° F | 0-0-1,100+ | 1,210-680-580 | 1,110-410-600 | 1,020-400-710 | 1,030-680-570 | 390-160-880 |
| Press. Cured 120 min./250° F | 60-0-1,100+ | 1,210-700-540 | 1,230-610-550 | 1,040-520-690 | 920-730-440 | 1,030-510-590 |
| Press. Cured 180 min./250° F | 60-0-1,100+ | 1,100-710-520 | 1,220-630-530 | 1,030-550-660 | 960-710-440 | 980-610-510 |
| Air Oven Cured 60 min./250° F | 0-0-1,100+ | 0-0-1,100+ | 0-0-1,100+ | 920-120-760 | 0-0-1,000+ | 0-0-1,100+ |
| Air Oven Cured 120 min./250° F | 0-0-1,100+ | 0-0-1,100+ | 0-0-1,100+ | 870-230-560 | 0-0-1,000+ | 0-0-1,100+ |
| Air Oven Cured 180 min./250° F | 0-0-1,000+ | 0-0-1,100+ | 0-0-1,100+ | 910-340-600 | 0-0-1,100+ | 0-0-1,100+ |

*Table I(b)*

| | | | | | | |
|---|---|---|---|---|---|---|
| Co-polymer | 100.0 | 100.0 | 100.0 | 100.0 | 100.0 | 100.0 | 100.0 |
| Stearic Acid | 3.0 | 3.0 | 3.0 | 3.0 | 3.0 | 3.0 | 3.0 |
| Carbon Black | 54.0 | 54.0 | 54.0 | 54.0 | 54.0 | 54.0 | 54.0 |
| Paraquinone Dioxime Dibenzoate | 6.0 | 6.0 | 6.0 | 6.0 | 6.0 | 6.0 | 6.0 |
| $Cu_2O$ | 5.0 | ----- | ----- | ----- | ----- | ----- | ----- |
| CuO | ----- | 5.0 | ----- | ----- | ----- | ----- | ----- |
| HgO | ----- | ----- | 5.0 | ----- | ----- | ----- | ----- |
| CdO | ----- | ----- | ----- | 5.0 | ----- | ----- | ----- |
| NiO | ----- | ----- | ----- | ----- | 5.0 | ----- | ----- |
| $(PbO)_2 \cdot H_2O$ | ----- | ----- | ----- | ----- | ----- | 5.0 | ----- |
| $Bi(OH)_3$ | ----- | ----- | ----- | ----- | ----- | ----- | 5.0 |
| Tensile—Mod. at 300%—Elong.: | | | | | | | |
| Press. Cured 60 min./250° F | Poor Cures | Poor Cures | 1,210-630-610 | 1,090-330-670 | Poor Cures | 1,070-360-590 | 50-0-1,100+ |
| Press. Cured 120 min./250° F | | | 1,200-640-610 | 1,140-530-610 | | 1,090-450-580 | 120-60-1,100+ |
| Press. Cured 180 min./250° F | | | 1,130-640-540 | 1,230-550-690 | | 1,070-470-570 | 200-90-1,100+ |
| Air Oven Cured 60 min./250° F | 0-0-1,100+ | 0-0-1,100+ | 1,220-140-720 | 0-0-1,100+ | 0-0-1,100+ | 920-400-490 | 130-130-1,100+ |
| Air Oven Cured 120 min./250° F | 0-0-1,100+ | 0-0-1,100+ | 1,080-270-1,080 | 0-0-1,100+ | 0-0-1,100+ | 1,070-590-490 | 120-120-1,100+ |
| Air Oven Cured 180 min./250° F | 0-0-1,100+ | 0-0-1,100+ | 940-270-670 | 130-0-740 | 0-0-1,100+ | 930-610-430 | 0-0-1,050 |

EXAMPLE 2

The polymer used in this example was prepared in the same manner as in Example 1, and samples of this polymer were compounded in a similar manner, except that the purpose of the tests in this case was to determine the effect of different proportions of a single lead compound, namely $(PbO)_2 \cdot H_2O$, sometimes written as $Pb_2O(OH)_2$. The tests applied were the same as in Example 1. The results of these tests are shown in Table II, in which the tensile strength, ultimate elongation and modulus at 300% elongation of the cured product are shown in this order.

*Table II*

| | | | |
|---|---|---|---|
| Co-polymer | 100.0 | 100.0 | 100.0 |
| Stearic Acid | 3.0 | 3.0 | 3.0 |
| Carbon Black | 54.0 | 54.0 | 54.0 |
| Paraquinone Dioxime Dibenzoate | 6.0 | 6.0 | 6.0 |
| $(PbO)_2 \cdot H_2O$ | 5.0 | 10.0 | 20.0 |
| Tensile—Elong.—Mod. at 300%: | | | |
| Press. Cured 60 min./250° F | 1,070-590-360 | 770-660-190 | 820-850-200 |
| Press. Cured 120 min./250° F | 1,090-580-450 | 1,050-640-420 | 960-760-260 |
| Press. Cured 180 min./250° F | 1,070-570-470 | 1,060-590-430 | 990-680-310 |
| Air Oven Cured 60 min./250° F | 920-490-400 | 990-500-500 | 1,000-560-375 |
| Air Oven Cured 120 min./250° F | 1,060-490-590 | 1,060-460-590 | 980-560-490 |
| Air Oven Cured 180 min./250° F | 930-430-610 | 990-440-630 | 900-460-520 |

EXAMPLE 3

In this example the materials employed were the same as in Example 2 except that comparisons were made of the effect of two different proportions of PbO instead of $(PbO)_2 \cdot H_2O$. Similar tests were made of the products. The results are shown in Table III, in which the tensile strength, modulus at 300% elongation and ultimate elongation of the product are shown in this order.

*Table III*

| | | |
|---|---|---|
| Co-polymer | 100.0 | 100.0 |
| Stearic Acid | 3.0 | 3.0 |
| Carbon Black | 54.0 | 54.0 |
| Paraquinone Dioxime Dibenzoate | 6.0 | 6.0 |
| PbO | 2.5 | 5.0 |
| Tensile—Mod. at 300%—Elong.: | | |
| Press. Cured 60 min./250° F | 1,050-380-650 | 940-160-880 |
| Press. Cured 120 min./250° F | 1,110-450-640 | 1,060-270-790 |
| Press. Cured 180 min./250° F | 1,110-420-610 | 1,000-340-700 |
| Air Oven Cured 60 min./250° F | 1,000-390-550 | 1,140-300-710 |
| Air Oven Cured 120 min./250° F | 1,060-490-550 | 1,080-510-650 |
| Air Oven Cured 180 min./250° F | 1,050-480-530 | 980-610-540 |

The data shown in the above tables clearly indicate that the compounds PbO and its hydrate are outstandingly effective in promoting cures with p-quinone dioxime dibenzoate when the curing is conducted in an air oven.

While there are described above but a limited number of embodiments of the present invention, it is possible to produce still other embodiments without departing from the inventive concept herein disclosed, and it is accordingly desired that the invention be considered as limited solely by the terms of the appended claims.

I claim:

1. An improved process for curing a rubbery synthetic interpolymer of isobutylene with a diolefin having from 4 to 14 carbon atoms per molecule, comprising the steps in combination of adding to the said interpolymer from 0.2 part to 10 parts of a p-quinone dioxime ester curing agent per 100 of polymer and from 1 to 20 parts of a lead and oxygen containing compound selected from the class consisting of PbO and its hydrates per 100 parts of polymer and thereafter heating the material to curing temperature in a curing oven in the presence of air at atmospheric pressure for an appropriate curing time.

2. An improved process for curing a rubbery synthetic interpolymer of isobutylene with isoprene, comprising the steps in combination of adding to the said interpolymer from 0.2 part to 10 parts of a p-quinone dioxime ester curing agent per 100 of polymer and from 1 to 20 parts of a lead and oxygen containing compound selected from the class consisting of PbO and its hydrates per 100 parts of polymer and thereafter heating the material to curing temperature in a curing oven in the presence of air at atmospheric pressure for an appropriate curing time.

3. An improved process for curing a rubbery synthetic interpolymer of isobutylene with isoprene, comprising the steps in combination of adding to the said interpolymer from 0.2 part to 10 parts of a p-quinone dioxime ester with benzoic acid curing agent per 100 of polymer and from 1 to 20 parts of a lead and oxygen containing compound selected from the class consisting of PbO and its hydrates per 100 parts of polymer and thereafter heating the material to curing temperature in a curing oven in the presence of air at atmospheric pressure for an appropriate curing time.

4. An improved process for curing a rubbery synthetic interpolymer of isobutylene with isoprene, comprising the steps in combination of adding to the said interpolymer from 0.2 part to 10 parts of a p-quinone dioxime ester curing agent per 100 of polymer and from 1 to 20 parts of lead hydrate, comprising $(PbO)_2H_2O$, per 100 parts of polymer and thereafter heating the material to curing temperature in a curing oven in the presence of air at atmospheric pressure for an appropriate curing time.

FRANCIS P. BALDWIN.

REFERENCES CITED

The following references are of record in the file of this patent:

UNITED STATES PATENTS

| Number | Name | Date |
|---|---|---|
| 2,170,191 | Fisher | Aug. 22, 1939 |
| 2,391,742 | Roberts | Dec. 25, 1945 |
| 2,393,321 | Haworth | Jan. 22, 1946 |
| 2,395,506 | Sauser | Feb. 26, 1946 |
| 2,427,514 | Sterrett et al. | Sept. 16, 1947 |